(12) United States Patent
Waible

(10) Patent No.: US 7,996,951 B2
(45) Date of Patent: Aug. 16, 2011

(54) ARTICULATION BETWEEN A WIPER LEVER AND A WIPER LEVER SUPPORT, AND ALSO A WIPER ARM COMPRISING SUCH AN ARTICULATION

(75) Inventor: Siegfried Waible, Flein (DE)

(73) Assignee: Valeo Wischersysteme GmbH, Bietigheim-Bissingen (DE)

( * ) Notice: Subject to any disclaimer, the term of this patent is extended or adjusted under 35 U.S.C. 154(b) by 727 days.

(21) Appl. No.: 11/631,210

(22) PCT Filed: Jun. 22, 2005

(86) PCT No.: PCT/EP2005/006734
§ 371 (c)(1),
(2), (4) Date: May 19, 2008

(87) PCT Pub. No.: WO2006/000394
PCT Pub. Date: Jan. 5, 2006

(65) Prior Publication Data
US 2009/0188068 A1     Jul. 30, 2009

(30) Foreign Application Priority Data
Jun. 29, 2004 (DE) .......................... 10 2004 031 322

(51) Int. Cl.
*B60S 1/34* (2006.01)
(52) U.S. Cl. ...................... 15/250.352; 15/250.351
(58) Field of Classification Search .............. 15/250.351, 15/250.352, 250.31, 250.34
See application file for complete search history.

(56) References Cited

U.S. PATENT DOCUMENTS 2,353,208 A * 7/1944 Whitted ............... 15/250.352
4,170,804 A * 10/1979 Scotcher ............... 15/250.34

FOREIGN PATENT DOCUMENTS

| DE | 3119176 A | 3/1982 |
|---|---|---|
| DE | 3709994 A1 | 10/1987 |
| DE | 3800946 C2 | 8/1989 |
| DE | 3231639 C2 | 6/1993 |
| DE | 43 33 554 | 10/1994 |
| EP | 845394 | 6/1998 |

(Continued)

OTHER PUBLICATIONS

German Search Report for German Priority Patent Application No. 10 2004 031 322.9, dated Mar. 6, 2007, and English translation thereof, 8 pages.

(Continued)

*Primary Examiner* — Gary K Graham
(74) *Attorney, Agent, or Firm* — Osha • Liang LLP

(57) ABSTRACT

In an articulated connection between a wiper lever and a wiper lever support which can be fixed to a wiper shaft, comprising articulation parts on the wiper lever and on the wiper lever support, a hinge pin on a first articulation part and at least one mounting opening on a second articulation part for receiving the hinge pin, the mounting opening is open at the side in an edge region in order to allow the second articulation part to be pushed radially onto the mounting pin, and specifically in an axis direction running radially with respect to the axis of the mounting opening, said axis direction being oriented transversely to the longitudinal extent of the wiper lever.

13 Claims, 4 Drawing Sheets

FOREIGN PATENT DOCUMENTS

| | | |
|---|---|---|
| FR | 1 265 101 | 6/1961 |
| GB | 2 004 734 | 4/1979 |
| JP | 2002-362326 A | 12/2002 |
| JP | 2003-335223 A | 11/2003 |

OTHER PUBLICATIONS

International Search Report for PCT/EP2005/006734 mailed Sep. 15, 2005 (2 pages).

Japanese Office Action for Application No. 2007-518505, mailed on Oct. 5, 2010 (6 pages).
Patent Abstracts of Japan for Japanese Publication No. 2003-335223, publication date Nov. 25, 2003 (1 page).
Patent Abstracts of Japan for Japanese Publication No. 2002-362326, publication date Dec. 18, 2002 (1 page).

* cited by examiner

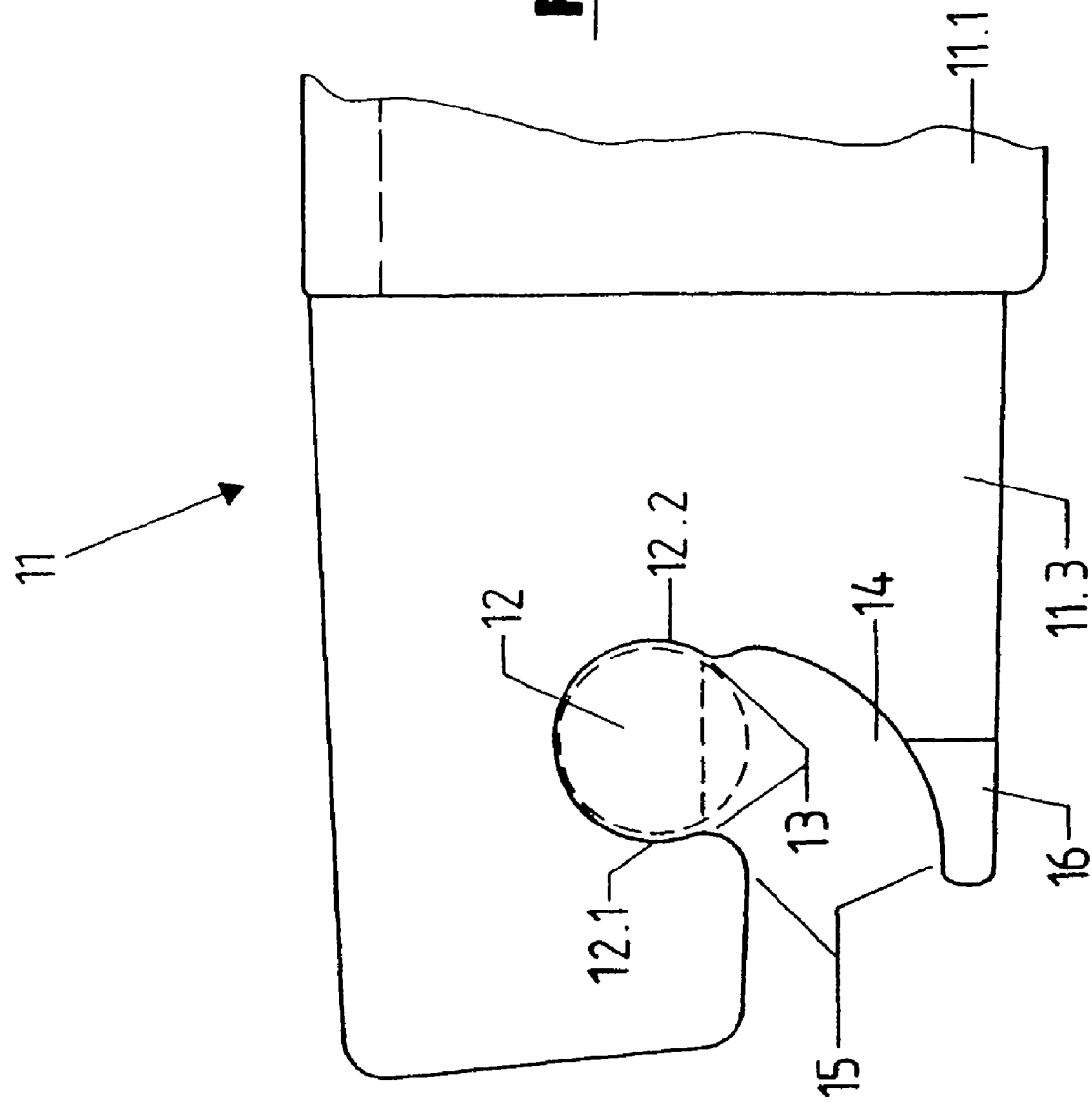

ARTICULATION BETWEEN A WIPER LEVER AND A WIPER LEVER SUPPORT, AND ALSO A WIPER ARM COMPRISING SUCH AN ARTICULATION

The invention relates to an articulation between a wiper lever and a wiper lever support of a wiper arm and to a wiper arm comprising such an articulation.

Wiper arms of windscreen wipers, essentially consisting of the wiper lever support or a fixing part for the wiper arm, which is provided on a wiper shaft, and the wiper lever itself which is connected in an articulated manner to the wiper lever support so as to pivot between an operating position and a service position and to which the customary wiper blade is fixed, are known in various embodiments. In particular, those embodiments are known which allow mounting of the wiper lever on the wiper lever support in the region of the articulation, and specifically by pushing the wiper lever, which has mounting openings that are open at the side, radially onto a hinge pin provided on the wiper lever support. Here, the mounting openings are open in the direction of the longitudinal extent of the wiper lever, towards the articulation-side end of this lever. The articulated connection between the wiper lever and the wiper lever support is secured by means of a pressure spring which acts between the wiper lever and the wiper lever support and which serves to press the wiper blade against the vehicle window.

Also known are wiper arms (DE 37 09 994 A1, EP 0 845 394 B1) in which conversely two parallel mounting openings are provided on the wiper lever support for the mounting pins on the wiper lever. The mounting openings are again open at the side for the radial insertion of the mounting pin, and specifically are open towards the wiper lever and once again approximately in the direction of the longitudinal extent of the wiper lever when this lever is in the operating position.

Since in the known embodiments the mounting openings are in each case open in the direction of the longitudinal extent of the wiper lever at least when the wiper lever is in the operating position, in the event of lateral forces acting on the wiper lever, e.g. in car washes or in the event of increased forces which occur between the wiper lever and the wiper lever support during operation of the windscreen wiper, there is a risk of detachment of the wiper lever from the wiper lever support, and specifically due to the articulation part on the wiper lever being pushed or pulled out of the articulation part on the wiper lever support. In order to solve this problem, it has been proposed inter alia to provide a securing web on the wiper lever, which securing web, in the operating position of the wiper lever, engages behind the wiper lever support in the region of a recess, but this means a more complicated design and/or manufacturing process.

The object of the invention is to provide an articulation which considerably reduces the risk of detachment in the event of lateral forces acting on the wiper lever, while retaining the advantage of simple mounting of the wiper lever on the wiper lever support and with a simple design.

In the articulation according to the invention, the at least one mounting opening for the simple mounting of the wiper lever is likewise open at the edge, with this open region of the mounting opening being open in a direction running radially with respect to the axis of the mounting opening, said direction not being oriented in the direction of the longitudinal extent of the wiper lever in the operating position but rather being oriented transversely to this longitudinal extent, for example towards the underside of the wiper lever. As a result, the mounting opening has, on either side of its radially open region, edge regions which lie diametrically opposite one another in the direction of the longitudinal extent of the wiper lever with respect to the axis of the mounting opening. These two edge regions are supported against the hinge pin in such a way that forces which act laterally on the wiper lever can be transferred in a particularly effective manner to the wiper lever support via these two edge regions of the mounting opening.

In one preferred embodiment of the invention, an over-latching mechanism is additionally provided which allows pivoting of the wiper lever from the operating position into the service position only by means of overlatching, i.e. only by applying an additional higher latching force. This effectively prevents inter alia the situation whereby the wiper lever, under the effect of external force, for example clue to wind forces when travelling at high speed, lifts away from the vehicle window.

Further developments of the invention form the subject matter of the dependent claims. The invention will be explained in more detail below with reference to the figures and on the basis of an example of embodiment. In the figures:

FIG. 6. shows, in a detailed view, a wall section of the articulation part on the wiper lever with the associated mounting opening.

Figure 2:
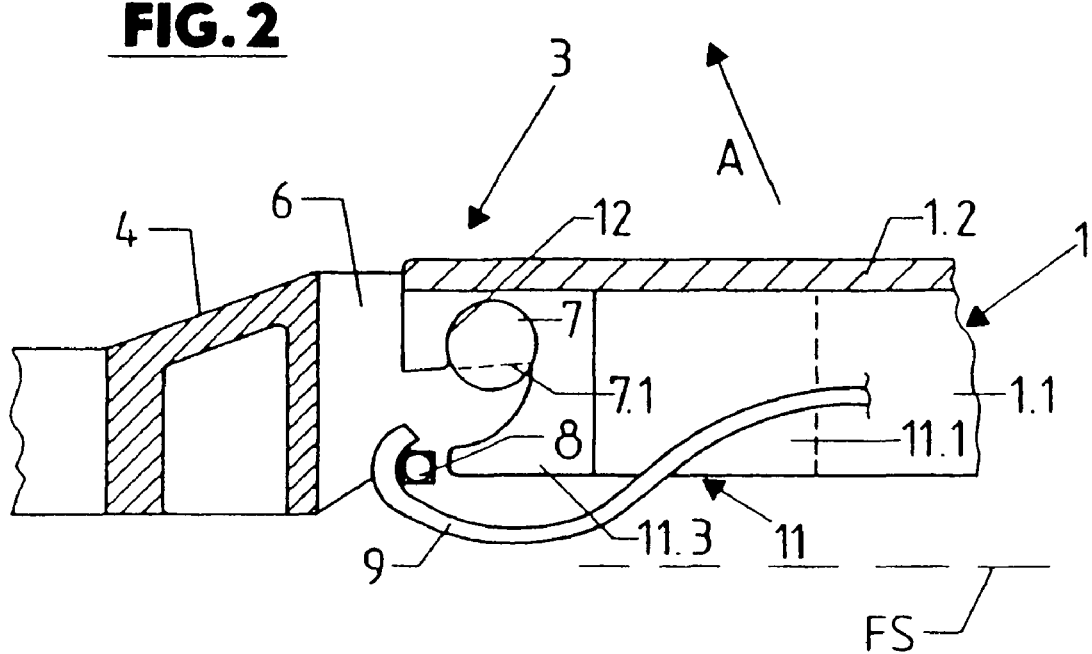
FIG. 2 shows, in a simplified partial view, a longitudinal section through the wiper arm in the region of the articulation.
Figure 3:
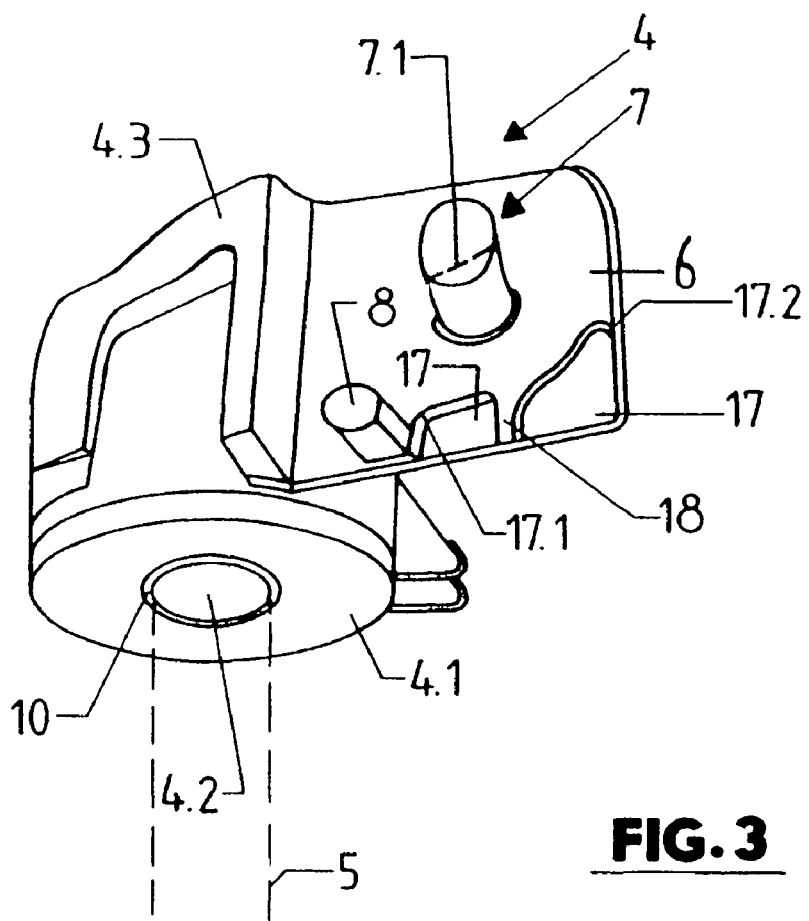
FIG. 3 shows the wiper lever support in a perspective view and partially cut away.
Figure 4:
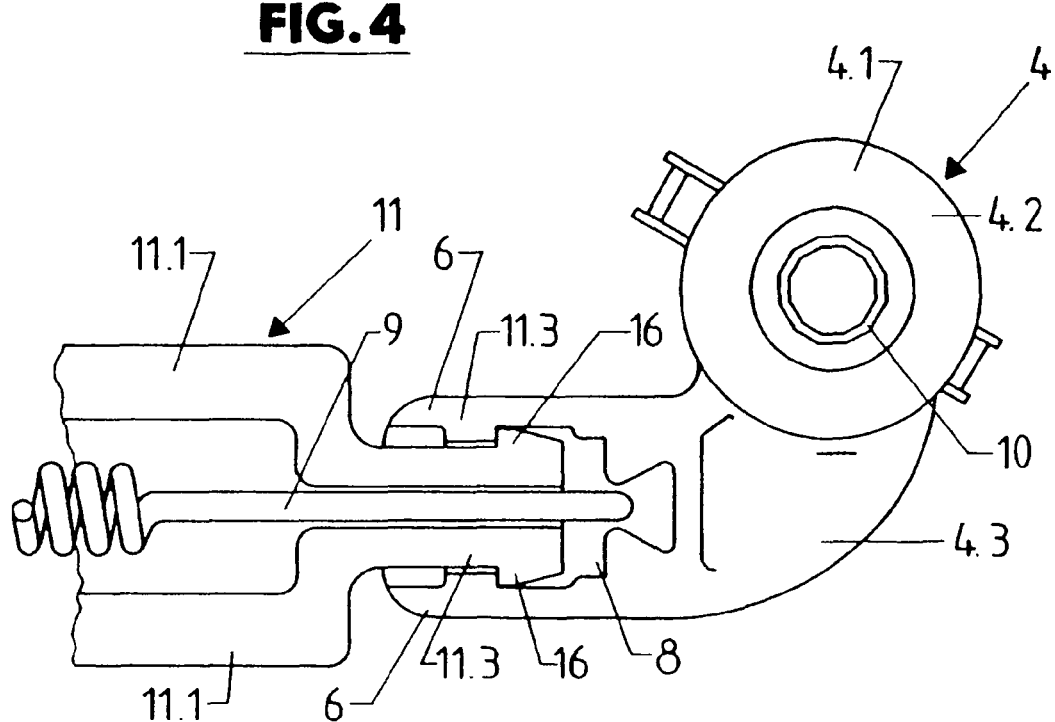
FIG. 4 shows, in a partial view, a bottom view of the wiper arm in the region of the articulation with the wiper lever in the operating position.
Figure 5:
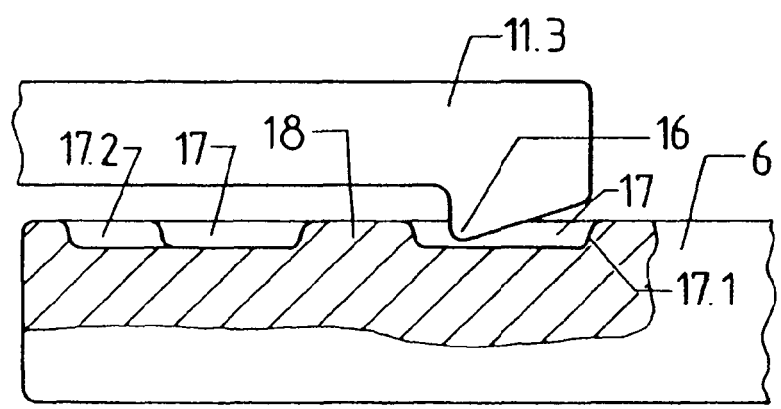
FIG. 5 shows, in an enlarged schematic view, a latching element and a counterlatching element of the overlatching mechanism provided between the wiper lever and the wiper lever support.

In the figures, 1 denotes a wiper lever of a wiper arms 2 of a windscreen wiper system for a vehicle window FS, for example the windscreen or rear window of a vehicle, which is shown schematically in dashed line in FIG. 2. The wiper lever 1 is connected in an articulated manner via an articulation 3 to a wiper lever support 4 which also forms part of the wiper arm 2 and, as the fixing part of the wiper arm 2, can be fixed to a wiper shaft 5 which is shown in dashed line 5 in FIG. 3, said wiper shaft being driven in a reversing manner for the pivoting movement of the wiper lever 1.

Figure 1:
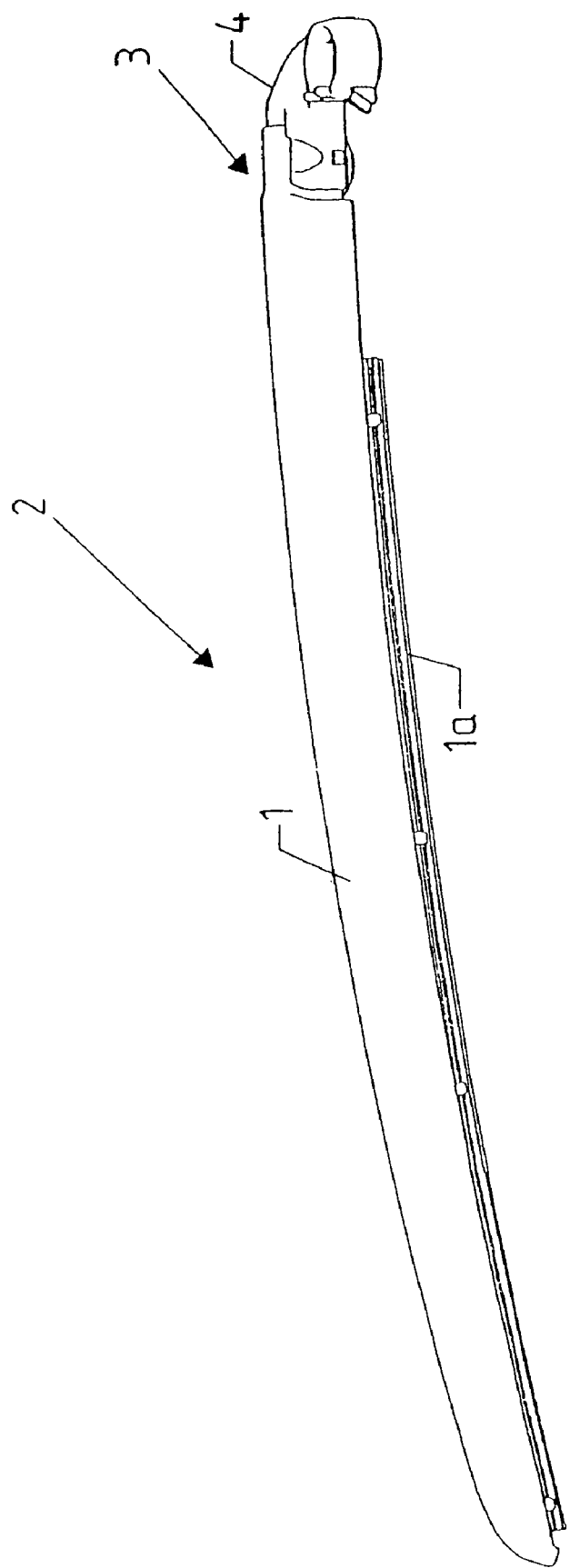
FIG. 1 shows, in a simplified perspective view, a wiper arm according to the invention consisting of the wiper lever made of plastic, the wiper lever support and the articulation provided between the wiper lever and the wiper lever support.

By means of the articulation 3, the wiper lever 1 can be pivoted (arrow A) out of its operating position shown in FIG. 1, in which it lies with its underside over its entire length next to the vehicle window FS and the wiper blade 1a provided on the wiper lever 1 bears against the vehicle window FS, and into a service position in which the wiper lever 1 is pivoted away from the vehicle window FS, for example for replacing the wiper blade 1a or for manual cleaning of the vehicle window, and is oriented with its longitudinal extent at an angle to the plane of the vehicle window.

In the illustrated embodiment, the wiper lever support 4 consists essentially of a sleeve-like section 4.1 which surrounds the wiper shaft 5 and has a bore 4.2 for the wiper shaft 5, and of a curved arm 4.3 which protrudes away from the section 4.1.

At the free end of the arm 4.3, which is designed in a fork-like manner with two parallel, spaced-apart wall sections 6, a hinge pin 7 is provided which together with the wall sections 6 forms the associated articulation part of the articulation 3 between the wiper lever 1 and the wiper lever support 4. The hinge pin 7 lies with its longitudinal extent perpendicular to the plane of the two wall sections 6 and thus also perpendicular to the axis of the bore 4.3 and, with the wiper arm 2 mounted on the vehicle, parallel to the plane of the vehicle window FS. Accordingly, the planes of the two wall sections 6 are oriented parallel to the axis of the bore 4.2 and, with the wiper lever 1 mounted, perpendicular or approximately perpendicular to the plane of the vehicle window FS. The hinge pin 7 extends between the two wall sections 6 and at either end merges into a respective wall section 6. On the underside of the arm 4.3 which lies closer to the vehicle when the wiper lever 1 is mounted, a further web 8 is provided between the two wall sections 6, on which web a pressure spring 9 is suspended by its support-side end, said pressure spring acting between the wiper lever 1 and the wiper lever support 4 and pressing the wiper blade 1a provided on the wiper lever 1 against the vehicle window FS in the operating position.

The wiper lever support 4 is made from plastic and is formed in one piece with all the aforementioned elements, as a shaped part or injection-moulded part. Only the bore 4.2 is reinforced by an inserted or injected metal sleeve 10.

The articulation 3 further comprises an articulation part 11 on the wiper arm side, said articulation part in the illustrated embodiment likewise being made as a shaped part or injection-moulded part from plastic. This articulation part 11 is an integral part of the wiper lever 1, which in the illustrated embodiment is produced from plastic essentially as a U-shaped profile comprising the two legs 1.1 and the yoke section 1.2 connecting the two legs. In the illustrated embodiment, the region designed as articulation part 11 is thus essentially also designed as a U-shaped profile which is open towards the underside of the wiper lever 1, and specifically with two wall sections or legs 11.1 which, with the wiper lever 1 mounted on the wiper lever support 4, are oriented perpendicular to the axis of the hinge pin 7. The pressure spring 9 or the hook-shaped hook-in part thereof then extends through the space formed between the two legs 11.1.

In the region of the hinge pin 7, the legs 11.1 in each case merge into a wall section 11.3. The two wall sections 11.3 are parallel to one another and are provided at a distance from one another so that, with the wiper lever 11 pivoted into the service position, there is still space between these wall sections for the hook-in part of the spring 9. However, the distance between the wall sections 11.3 is smaller than the distance between the legs 11.1 and, with the wiper lever 1 mounted on the wiper lever support 4, said wall sections are accommodated between the two wall sections 6 of the arm 4.3, and specifically in such a way that each wall section 11.1 bears with its outer side remote from the other wall section 11.1 against an inner surface of a wall section 6, or is directly adjacent thereto.

A respective mounting opening 12 for the hinge pin 7 is provided in each of the wall sections 11.3 which then lie perpendicular to the axis of the hinge pin 7 when the wiper lever 1 is mounted on the wiper lever support 4. The two mounting openings 12 arranged with their axes coaxial and oriented perpendicular to the planes of the wall sections 11.3 are in each case designed to be open at the edge in such a way that mounting of the articulation part 11 on the mounting pin 7 is possible by radially pushing it on and latching it in. To this end, the open region 13 of the two mounting openings 12 is slightly smaller than the diameter of the mounting pin 7.

One special feature of the articulation 3 consists in that each mounting opening 12 is open at the edge in a direction running radially with respect to its axis, said direction being oriented perpendicular or approximately perpendicular to the longitudinal extent of the wiper lever 1. In the illustrated embodiment, the open region 13 of each mounting opening 12 is accordingly located on the side of the mounting opening 12 which faces towards the underside of the articulation part 11. Here, each mounting opening 12 also forms with its edge two regions 12.1 and 12.2 which lie opposite one another and are offset with respect to one another in the direction of the longitudinal extent of the wiper lever 1, by means of which regions the articulation part 11 is supported against the mounting pin 7. As a result, any forces acting transversely to the wiper lever 1 or tangentially to the axis of the wiper shaft 5 and parallel to the axis of the articulation 3 in connection with supporting the wall sections 11.3 on the wall sections 6 are effectively and reliably transmitted from the wiper lever 1 via the articulation 3 to the wiper lever support 4. It has been found that, as a result of the described special design of the articulation 3, the ability of this articulation to withstand loads can be increased by up to 25% in comparison with articulations of conventional wiper arms.

In the illustrated embodiment, each mounting opening 12 merges at its open region 13 into a recess 14 which is likewise formed in the respective wall section 11.3 and which, starting from the region 13, extends in an approximately arc-shaped manner in the direction towards the underside of the articulation part 11 and in the direction towards the edge of the wall section 11.3 remote from the respective leg 11.1, said recess being open at this edge at 15. This open region 15 lies closer to the underside of the articulation part 11 and thus, with the wiper lever mounted, closer to the plane of the vehicle window FS than the region 13 and the mounting opening 12. On account of the recess 14, each wall section 11.3 forms on the underside of the articulation part 11 a hook-like section 11.3.1 which tapers towards the free end and ends at the open region 15, said section being provided on its outer side with a latching protrusion or latching hook 16 which is at a radial distance from the axis of the mounting openings 12 and thus also from the axis of the hinge pin 7. For these latching hooks 16, a respective depression 17 which extends around the axis of the hinge pin 7 is provided on the facing inner surfaces of the wall sections 6. Each depression 17 is interrupted by a web 18 between its two ends 17.1 and 17.2. The web 18 forms a counterlatching element for the associated latching hooks 16.

With the wiper lever 1 in the operating position, the respective latching hook 16 is in a position in which it engages behind the web 18, i.e. in the remote end 17.1 of the depression 17 between the web 18 and the free end of the arm 4.3, so that the wiper lever 1 can be pivoted away from the vehicle window FS only by moving the latching hooks 16 past the webs 18 and thus only by overcoming an additional latching force. The latching hooks 16 and webs 18 thus form an overlatching mechanism.

A defined end position in the service position is also achieved by means of the latching hooks 16 and the depressions 17, namely in that the latching hooks 16 in this case come to bear against the other end 17.2 of the respective depression 17.

The invention has been described above on the basis of an example of embodiment. It will be understood that numerous variations and modifications are possible without departing from the inventive concept on which the invention is based.

For example, it is possible to flatten the hinge pin 7 as shown at 7.1 in the figures, in order thus to make it easier to push the wiper lever 1 onto this hinge pin in the service position. The flattened portion 7.1 then lies in a plane perpendicular or approximately perpendicular to the axis of the bore 4.2.

LIST OF REFERENCES 1 wiper lever
1.1 leg of the wiper lever 1
1.2 yoke section of the wiper lever 1
1a wiper blade
2 wiper arm
3 articulation
4 wiper lever support
4.1 sleeve-like section of the wiper lever support 4
4.2 bore of the wiper lever support 4
4.3 arm of the wiper lever support 4
5 wiper shaft
6 wall section
7 hinge pin
7.1 flattened portion
8 web
9 pressure spring
10 metal sleeve
11 articulation part
11.1 leg of the articulation part 11
11.3 wall section
11.3.1 hook-like section
12 mounting opening
12.1, 12.2 edge region of the mounting opening 12
13 open region of the mounting opening 12
14 recess
15 open region of the recess 14
16 latching protrusion or latching hook
17 depression
17.1, 17.2 end of the depression 17
18 web
A pivoting movement of the wiper lever from the operating position to the service position
FS vehicle window

The invention claimed is:

1. An articulation between a wiper lever and a wiper lever support which can be fixed to a wiper shaft, for pivoting the wiper lever between an operating position and a service position, comprising articulation parts on the wiper lever and on the wiper lever support, a hinge pin on a first articulation part and at least one mounting opening on a second articulation part for receiving the hinge pin to enable rotation about an axis defined by the mounting opening, wherein the mounting opening is open at a side in an open region in order to allow the second articulation part to be pushed radially onto the hinge pin and, adjoining the open region, two edge regions of the mounting opening are formed for bearing against the hinge pin,
   wherein, at least when the wiper lever is in the operating position, the at least one mounting opening is open at the open side in the open region in an axis direction running radially with respect to the axis of the mounting opening, said axis direction being oriented transversely to the longitudinal extent of the wiper lever, and the two edge regions of the mounting opening lie diametrically opposite one another in the direction of the longitudinal extent of the wiper lever with respect to the axis of the mounting opening and of the hinge pin.

2. The articulation according to claim 1, wherein the open region of the at least one mounting opening is arranged in such a way that this mounting opening, at least when the wiper lever is in the operating position, is open towards the underside thereof.

3. The articulation according to claim 1, wherein the first articulation part, on a part-section comprising the hinge pin, is fork-shaped with two parallel wall sections which are spaced apart from one another, and in that the hinge pin extends between the parallel wall sections.

4. The articulation according to claim 1, wherein the second articulation part, on a part-section comprising the at least one mounting opening, is fork-shaped with two parallel wall sections which are spaced apart from one another, and in that wherein a mounting opening is provided in each of the parallel wall sections.

5. The articulation according to claim 1, wherein, in a region of the hinge pin, one of the two articulation parts engages over the other articulation part.

6. The articulation according to claim 1, further comprising latching means which act between the articulation parts and which allow pivoting of the wiper lever from the operating position into the service position only by overlatching or by applying an additional latching force.

7. The articulation according to claim 6, wherein the latching means are formed by at least one latching element which is at a radial distance from the axis of the hinge pin and by at least one counterlatching element which cooperates therewith, wherein the counterlatching element is arranged in the movement path of the at least one latching element such that the latter is located on one side of the counterlatching element in the operating position of the wiper lever and is located on the other side of the counterlatching element in the service position.

8. The articulation according to claim 7, wherein the second articulation part comprises the at least one latching element at a radial offset with respect to the mounting opening, and wherein the at least one counterlatching element is provided on the first articulation part, in a region of a depression in a wall section which protrudes laterally beyond the second articulation part, said depression forming a movement space for the at least one latching element.

9. The articulation according to claim 1, wherein at least one latching element which cooperates with a counterlatching element is provided on two wall sections of the second articulation part, each of said wall sections comprising a mounting opening.

10. The articulation according to claim 1, wherein the first articulation part is formed by one end of an arm of the wiper lever support, and wherein the second articulation part is provided on the wiper lever or forms part of the wiper lever.

11. The articulation according to claim 1, wherein the wiper lever support is formed in one piece with the associated articulation part, from one selected from a group consisting of plastic and metal.

12. The articulation according to claim 1, wherein the hinge pin is flattened.

13. A wiper arm for windscreen wipers of vehicles, comprising a wiper lever support and a wiper lever which is connected to the wiper lever support and pivots via an articulation between an operating position and a service position, wherein the articulation is according to claim 1.

* * * * *